(12) United States Patent
Poornachandran et al.

(10) Patent No.: US 10,581,815 B2
(45) Date of Patent: Mar. 3, 2020

(54) TECHNOLOGIES FOR SECURE MEDIATED REALITY CONTENT PUBLISHING

(71) Applicant: Intel Corporation, Santa Clara, CA (US)

(72) Inventors: Rajesh Poornachandran, Portland, OR (US); Ned M. Smith, Beaverton, OR (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 792 days.

(21) Appl. No.: 15/143,741

(22) Filed: May 2, 2016

(65) Prior Publication Data

US 2017/0317996 A1 Nov. 2, 2017

(51) Int. Cl.
| | |
|---|---|
| *H04L 29/06* | (2006.01) |
| *G06F 21/00* | (2013.01) |
| *G06F 21/10* | (2013.01) |
| *H04N 21/266* | (2011.01) |
| *H04N 21/254* | (2011.01) |

(52) U.S. Cl.
CPC ............ *H04L 63/061* (2013.01); *G06F 21/10* (2013.01); *H04N 21/2541* (2013.01); *H04N 21/26613* (2013.01); *G06F 2221/0706* (2013.01); *H04L 63/045* (2013.01); *H04L 63/0823* (2013.01); *H04L 63/0853* (2013.01); *H04L 2463/082* (2013.01)

(58) Field of Classification Search
CPC ............ H04L 63/061; H04L 2463/082; H04L 63/045; H04L 63/0853; H04L 63/0823; H04N 21/26613; H04N 21/2541; G06F 21/10; G06F 2221/0706
See application file for complete search history.

(56) References Cited

U.S. PATENT DOCUMENTS

2016/0342774 A1* 11/2016 Henkel-Wallace .......................... G06F 21/105
2016/0350534 A1* 12/2016 Poornachandran ..... G06F 21/57

* cited by examiner

*Primary Examiner* — Lisa C Lewis
(74) *Attorney, Agent, or Firm* — Barnes & Thornburg LLP

(57) ABSTRACT

Technologies for secure mediated reality content publishing includes one or more mediated reality servers, multiple mediated reality listeners, and multiple mediated reality creators. The mediated reality server performs an attestation procedure with each listener based on a pre-provisioned attestation credential of that listener and provisions a session encryption key to each validated listener. The attestation procedure may validate a trusted execution environment of each listener. The mediated reality server generates aggregated mediated reality content based on protected mediated reality content received from the creators and generates an associated license that defines one or more content usage restrictions of the aggregated mediated reality content. The server sends the aggregated mediated reality content to the listeners, protected by the corresponding session encryption key. The server may provision each of the listeners with a back-channel encryption key to protect feedback data generated by sensors of the listeners. Other embodiments are described and claimed.

25 Claims, 5 Drawing Sheets

TECHNOLOGIES FOR SECURE MEDIATED REALITY CONTENT PUBLISHING

BACKGROUND

Many current computing devices may provide mediated reality (MR) experiences, including any combination of virtual reality, augmented reality, and/or diminished reality experiences. MR experiences may include adding information to, subtracting information from, or otherwise manipulating a user's perception of reality using a computing device. For example, a virtual reality experience may render a completely computer-generated experience, an augmented reality experience may add computer-generated elements to a representation of the real world, and a diminished reality experience may remove elements from a representation of the real world. MR experiences thus typically may include a dynamic mash-up of content, and may include content from multiple creators combined, extracted, and recombined to generate dynamic experiences.

High-value content such as high-quality streaming video may be protected with digital rights management (DRM) technology. DRM-protected media may be encrypted or otherwise protected from unauthorized access. Thus, DRM-protected media may be difficult to manipulate or otherwise process in a non-trusted computing environment. Additionally, DRM-protected content from different producers may be subject to different licensing rules or other usage restrictions.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
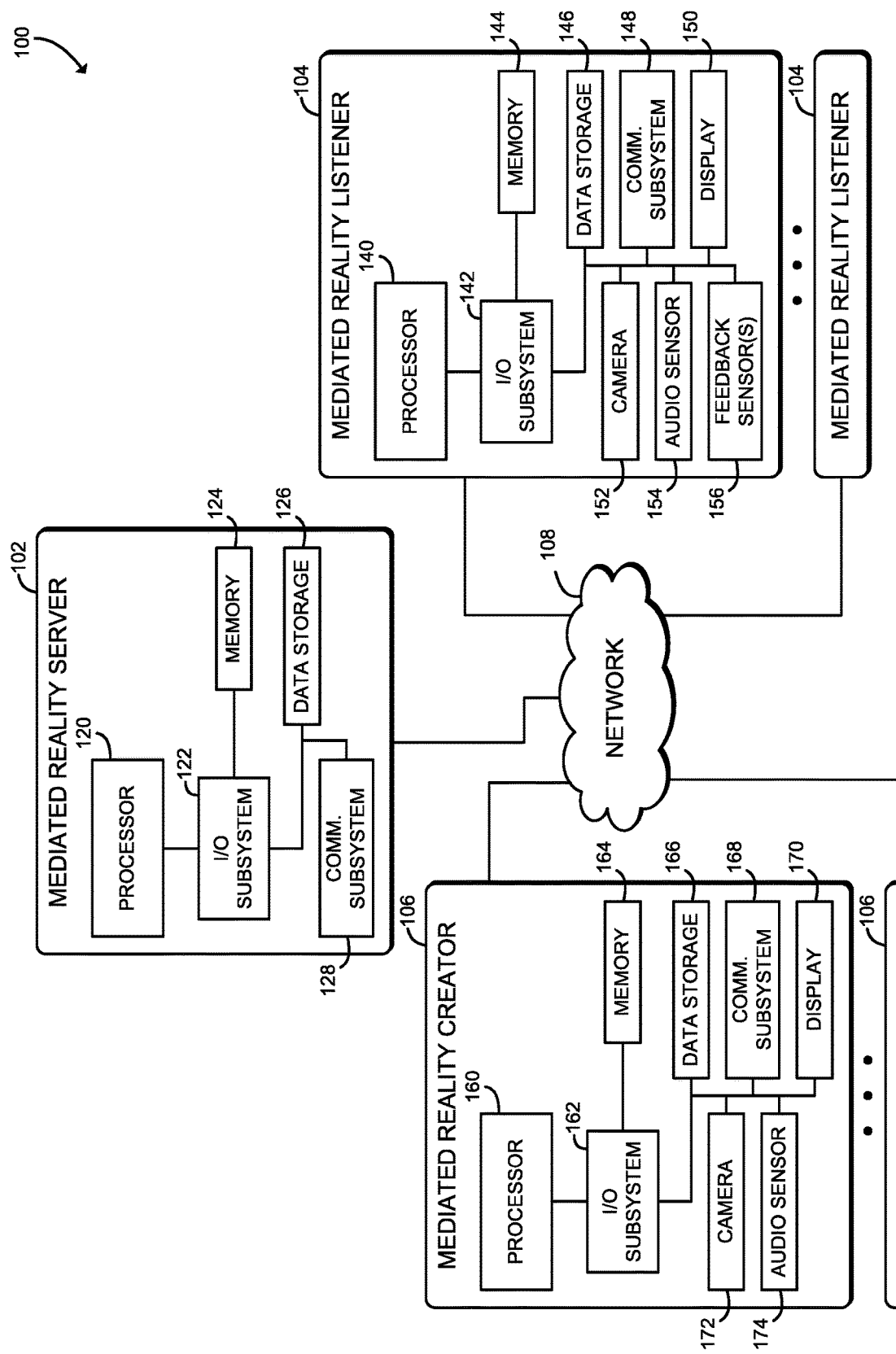
FIG. 1 is a simplified block diagram of at least one embodiment of a system for secure MR content publishing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for secure mediated reality (MR) content publishing includes a mediated reality server 102, one or more mediated reality listeners 104, and one or more mediated reality creators 106. Each of the mediated reality creators 106 may be used by a content producer such as a content studio, a high-value streaming media service, a celebrity or other personality, or other content producer. Each of the mediated reality listeners 104 may be used by a viewer or other content consumer. In use, as described in more detail below, each of the mediated reality listeners 104 and the mediated reality creators 106 are pre-provisioned with attestation credentials, such as an enhanced privacy identifier (EPID) key. The mediated reality server 102 performs an attestation procedure with each mediated reality listener 104 and mediated reality creator 106, and then securely distributes a session encryption key (SEK) to each device. The mediated reality creators 106 provide protected mediated reality (MR) content to the mediated reality server 102, the mediated reality server 102 mashes-up or otherwise aggregates the MR content, and then the mediated reality server 102 distributes the aggregated MR content to the mediated reality listeners 104 for rendering. The distributed MR content is protected using the SEK provisioned to each mediated reality listener 104. The mediated reality server 102 generates appropriate digital rights management (DRM) licenses and/or entitlements for the aggregated MR content, and the mediated reality listeners 104 enforce the DRM licensing requirements. The mediated reality server 102 may also securely distribute a back-channel encryption key (BEK) to the mediated reality listeners 104, which may be used to protect feedback data provided by the mediated reality listeners 104 to the mediated reality server 102. The feedback data may be indicative of, for example, the emotions and/or sentiment of the users of the mediated reality listeners 104.

Thus, by performing the attestation procedure, the system 100 may assure content creators (e.g., users of the mediated reality creators 106) that DRM content restrictions will be honored by the mediated reality listeners 104. By honoring DRM licensing requirements, the system 100 may facilitate the use of high-value protected content in MR aggregation experiences. Additionally, the system 100 may facilitate rich MR experiences that are suitable for broadcast to a large number of mediated reality listeners 104, such as may occur in social media interaction models. Additionally, the system 100 provides a secure back channel that may allow content creators to receive follower feedback from large number of followers.

The mediated reality server 102 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. As shown in FIG. 1, the mediated reality server 102 illustratively includes a processor 120, an input/output subsystem 122, a memory 124, a data storage device 126, and a communication subsystem 128. Of course, the mediated reality server 102 may include other or additional components, such as those commonly found in a server (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the mediated reality server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the mediated reality server 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processors 120, the memory 124, and other components of the mediated reality server 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. As described further below, the data storage device 126 may store and/or index various media objects and associated context data.

The communication subsystem 128 of the mediated reality server 102 may be embodied as any communication circuit, device, or collection thereof, capable of enabling communications between the mediated reality server 102, the mediated reality listeners 104, the mediated reality creators 106, and/or other remote devices over the network 108. The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

Each mediated reality listener 104 may be embodied as any type of computation or computer device capable of performing the functions described herein, including, without limitation, a mobile computing device, a smart phone, a computer, a laptop computer, a notebook computer, a tablet computer, a wearable computing device, a network appliance, a web appliance, a distributed computing system, a processor-based system, and/or a consumer electronic device. Thus, the mediated reality listener 104 includes components and devices commonly found in a smart phone or similar computing device, such as a processor 140, an I/O subsystem 142, a memory 144, a data storage device 146, a communication subsystem 148, and/or other peripheral devices. Those individual components of the mediated reality listener 104 may be similar to the corresponding components of the mediated reality server 102, the description of which is applicable to the corresponding components of the mediated reality listener 104 and is not repeated herein so as not to obscure the present disclosure.

Each mediated reality listener 104 may also include a display 150, a camera 152, an audio sensor 154, and one or more feedback sensors 156. The display 150 may be embodied as any type of display capable of displaying digital information such as a liquid crystal display (LCD), a light emitting diode (LED), a plasma display, a cathode ray tube (CRT), or other type of display device. The camera 152 may be embodied as a digital camera or other digital imaging device integrated with the mediated reality listener 104 or otherwise communicatively coupled thereto. The camera 152 includes an electronic image sensor, such as an active-pixel sensor (APS), e.g., a complementary metal-oxide-semiconductor (CMOS) sensor, or a charge-coupled device (CCD). The camera 152 may be used to capture images of the environment and/or user of the mediated reality listener 104 including, in some embodiments, capturing still images or video images. Similarly, the audio sensor 154 may be embodied as any sensor capable of capturing audio signals such as one or more microphones, a line input jack and associated circuitry, an analog-to-digital converter (ADC), or other type of audio sensor. The audio sensor 154 may be used to detect the audio environment of the mediated reality listener 104.

The feedback sensors 156 may include any sensors capable of measuring or otherwise capturing data indicative of emotions or other sentiment of a user of the mediated reality listener 104. For example the feedback sensors 156 may be embodied as a facial recognition camera or other sensor capable of gauging an emotional response of the user. In some embodiments, the feedback sensors 156 may include a video camera with associated depth sensor, such as Intel® RealSense™ technology. Additionally or alternatively, the feedback sensors 156 may be embodied as a biometric sensor such as a heart rate sensor, a galvanic skin response sensor, an electroencephalographic sensor, or other biometric sensor capable of generating sensor data indicative of user emotions.

Similarly, each mediated reality creator 106 may be embodied as any type of computation or computer device capable of performing the functions described herein, including, without limitation, a smartphone, a computer, a desktop computer, a workstation, a laptop computer, a notebook computer, a tablet computer, a wearable computing device, a network appliance, a web appliance, a server, a distributed computing system, a processor-based system, and/or a consumer electronic device. The mediated reality creator 106 may include components and devices commonly found in a smartphone or similar computing device, such as a processor 160, an I/O subsystem 162, a memory 164, a data storage device 166, communication circuitry 168, a display 170, a camera 172, an audio sensor 174, and/or other peripheral devices. Those individual components of the mediated reality creator 106 may be similar to the corresponding components of the mediated reality server 102 and/or the mediated reality listener 104, the description of which is applicable to the corresponding components of the mediated reality creator 106 and is not repeated herein so as not to obscure the present disclosure.

As discussed in more detail below, the mediated reality server 102, the mediated reality listeners 104, and the mediated reality creators 106 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, and switches, to facilitate communications among the devices of the system 100.

Figure 2:
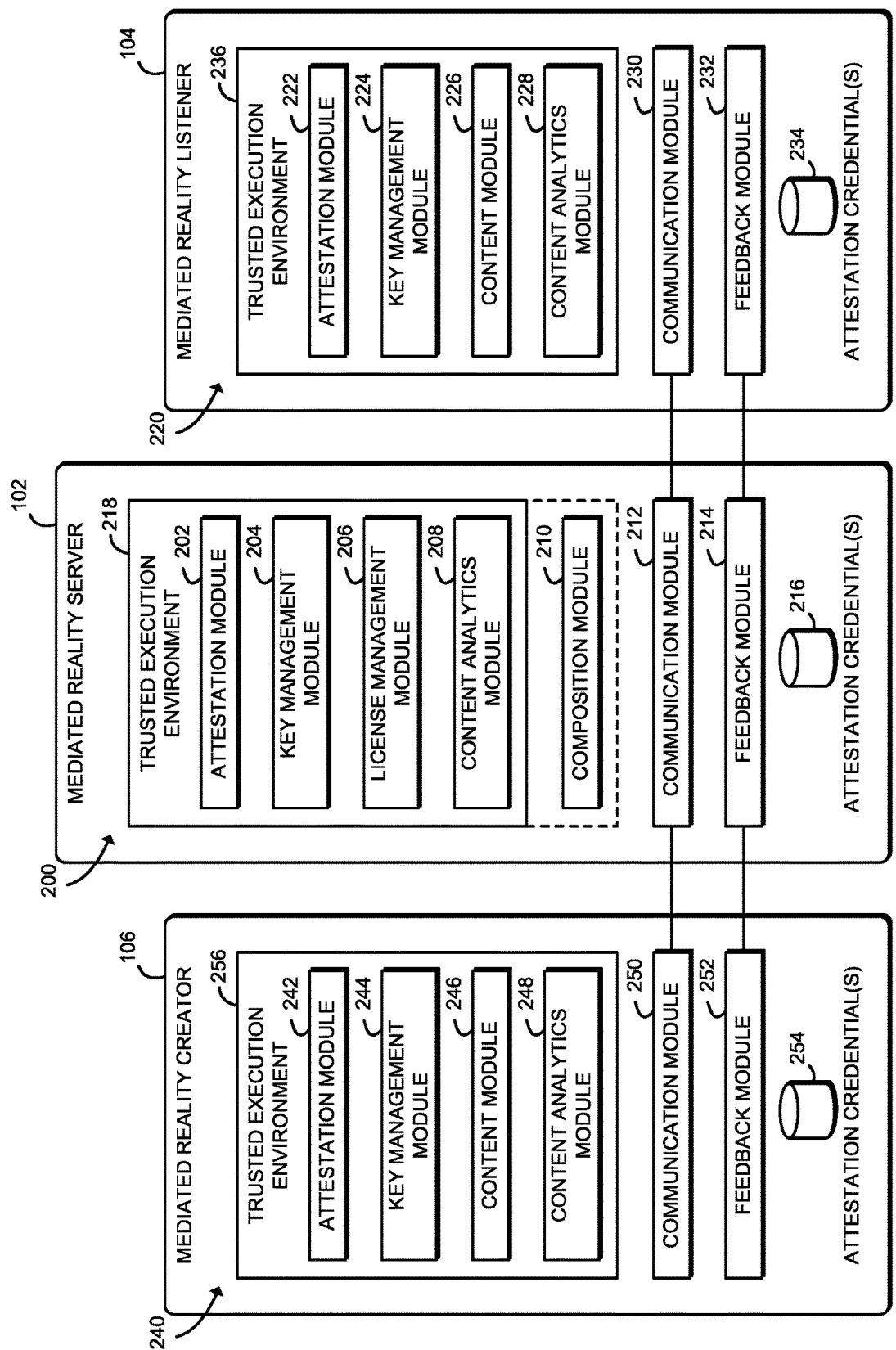
FIG. 2 is a simplified block diagram of at least one embodiment of various environments that may be established by the system of FIG. 1.

Referring now to FIG. 2, in an illustrative embodiment, the mediated reality server 102 establishes an environment 200 during operation. The illustrative environment 200 includes an attestation module 202, a key management module 204, a license management module 206, a content analytics module 208, a composition module 210, a communication module 212, and a feedback module 214. The various modules of the environment 200 may be embodied as hardware, firmware, software, or a combination thereof. As such, in some embodiments, one or more of the modules of the environment 200 may be embodied as circuitry or collection of electrical devices (e.g., attestation circuitry 202, key management circuitry 204, license management circuitry 206, content analytics circuitry 208, composition circuitry 210, communication circuitry 212, and/or feedback circuitry 214). It should be appreciated that, in such embodiments, one or more of the attestation circuitry 202, the key management circuitry 204, the license management circuitry 206, the content analytics circuitry 208, the composition circuitry 210, the communication circuitry 212, and/or the feedback circuitry 214 may form a portion of one or more of the processor 120, the I/O subsystem 122, and/or other components of the mediated reality server 102. Additionally, in some embodiments, one or more of the illustrative modules may form a portion of another module and/or one or more of the illustrative modules may be independent of one another.

The attestation module 202 is configured to perform an attestation procedure with one or more mediated reality listeners 104 based on pre-provisioned attestation credentials 234 of each mediated reality listener 104 and with one or more mediated reality creators 106 based on pre-provisioned attestation credentials 254 of each mediated reality creator 106. The attestation procedure may include verifying the authenticity of the mediated reality listener 104 or the mediated reality creator 106 using the respective attestation credentials 234, 254, and, if successful, establishing a secure communication channel between the mediated reality server 102 and each mediated reality listener 104 and/or mediated reality creator 106. The pre-provisioned attestation credentials 234, 254 of the mediated reality listener 104 and/or the mediated reality creators 106 may be verified using attestation credentials 216 provisioned to and/or accessible by the mediated reality server 102.

The key management module 204 is configured to securely provision a session encryption key to each mediated reality listener 104 and/or mediated reality creator 106 in response to successfully performing the attestation procedure. The key management module 204 may be further configured to securely provision a back-channel encryption key to each mediated reality listener 104 and/or mediated reality creator 106 in response to successfully performing the attestation procedure. The key management module 204 may be further configured to derive a session encryption key for each mediated reality listener 104 and/or mediated reality creator 106, and to derive a back-channel encryption key for each mediated reality listener 104 and/or mediated reality creator 106.

The composition module 210 is configured to generate aggregated mediated reality content based on protected mediated reality content received from each of the mediated reality creators 106. The aggregated mediated reality content may be created, for example, by compositing the protected mediated reality content received from multiple mediated reality creators 106.

The license management module 206 is configured to generate a license associated with the aggregated mediated reality content based on licenses that are associated with the protected mediated reality content received from the mediated reality creators 106. The generated license may define one or more content usage restrictions for the aggregated mediated reality content. The content analytics module 208 is configured to aggregate content metrics received from the mediated reality listeners 104, such as content consumption/creation metrics to identify the particular content consumed, the number of times a particular content is accessed, content ratings, content sharing activity, and other content metrics.

The communication module 212 is configured to send the aggregated mediated reality content and the associated license to the mediated reality listeners 104. The aggregated mediated reality content is protected by the corresponding session encryption key. The communication module 212 may be further configured to receive the protected mediated reality content and the associated licenses from the mediated reality creators 106. The protected mediated reality content is encrypted and each of the licenses may define one or more content usage restrictions for the corresponding protected mediated reality content. In some embodiments, the protected mediated reality content received from the mediated reality creators 106 may be protected by the corresponding session encryption key.

The feedback module 214 is configured to receive feedback data from the mediated reality listeners 104. The feedback data is generated by one or more of the feedback sensors 156 of the mediated reality listener 104, and may be indicative of an emotion of a user of the mediated reality listener 104. The feedback data is protected by the corresponding back-channel encryption key. The feedback module 214 may be further configured to modify the aggregated mediated reality content based on the feedback data that is received. The feedback module 214 may be further configured to aggregate the feedback data received from multiple mediated reality listeners 104 to generate aggregated feedback data, and to send the aggregated feedback data to the mediated reality creators 106. The aggregated feedback data may be protected by a corresponding back-channel encryption key. In some embodiments, the aggregated feedback data may include aggregated content metrics generated by the content analytics module 208.

As shown, the attestation module 202, the key management module 204, the license management module 206, the content analytics module 208, and, in some embodiments, the composition module 210 may be secured by a trusted execution environment 218. The trusted execution environment 218 may be embodied as any isolated, authenticated, or otherwise secure execution environment provided by the mediated reality server 102, and may be protected by one or more hardware features of the mediated reality server 102. The trusted execution environment 218 may also provide secure storage for encryption keys, license data, and other sensitive data. In some embodiments, the trusted execution environment 218 may be hosted or otherwise provided by a hardware component such as a converged security and manageability engine (CSME), security engine, trusted platform module (TPM), or other hardware component of the mediated reality server 102 that is independent of the processor 120. Additionally or alternatively, in some embodiments the trusted execution environment 218 may be embodied as a secure environment established by the processor 120, such as a secure enclave established using secure enclave support of the processor 120, such as Intel® Software Guard Extensions (SGX) technology, a secure world established using ARM® TrustZone® technology, or other secure execution environment. The trusted execution environment 218 may provide a system-level (e.g., ring-0) memory protection scope, a user-level (e.g., ring-3) memory protection scope, or in some embodiments a combination of system- and user-level memory protection scopes. For example, in some embodiments the attestation module 202, the key management module 204, and/or the license management module 206 may be secured by a user-level trusted execution environment 218 (e.g., an SGX secure enclave), and the composition module 210 may be secured by a system-level trusted execution environment 218 (e.g., a ring-0 driver).

Still referring to FIG. 2, in the illustrative embodiment, each mediated reality listener 104 establishes an environment 220 during operation. The illustrative environment 220 includes an attestation module 222, a key management module 224, a content module 226, a content analytics module 228, a communication module 230, and a feedback module 232. The various modules of the environment 220 may be embodied as hardware, firmware, software, or a combination thereof. As such, in some embodiments, one or more of the modules of the environment 220 may be embodied as circuitry or collection of electrical devices (e.g., attestation circuitry 222, key management circuitry 224, content circuitry 226, content analytics circuitry 228, communication circuitry 230, and/or feedback circuitry 232). It should be appreciated that, in such embodiments, one or more of the attestation circuitry 222, the key management circuitry 224, the content circuitry 226, the content analytics circuitry 228, the communication circuitry 230, and/or the feedback circuitry 232 may form a portion of one or more of the processor 140, the I/O subsystem 142, and/or other components of the mediated reality listener 104. Additionally, in some embodiments, one or more of the illustrative modules may form a portion of another module and/or one or more of the illustrative modules may be independent of one another.

The attestation module 222 is configured to provision the mediated reality listener 104 with the attestation credentials 234 and to perform an attestation procedure with the mediated reality server 102 based on the attestation credentials 234 after provisioning. Provisioning the mediated reality listener 104 with the attestation credentials 234 may include, for example, the manufacturer of the mediated reality listener 104 provisioning the mediated reality listener 104 with an enhanced privacy identifier (EPID) private key.

The key management module 224 is configured to securely provision a session encryption key to the mediated reality listener 104 from the mediated reality server 102 in response successfully performing the attestation procedure. The key management module 224 may be further configured to securely provision a back-channel encryption key to the mediated reality listener 104 from the mediated reality server 102 in response successfully performing the attestation procedure.

The communication module 230 is configured to securely receive aggregated mediated reality content and an associated license from the mediated reality server 102. As described above, the aggregated mediated reality content is based on protected mediated reality content created by the mediated reality creators 106. The aggregated mediated reality content is protected by the corresponding session encryption key, and the license may define one or more content usage restrictions for the aggregated mediated reality content. The content module 226 is configured to enforce the license, and to render the aggregated mediated reality content in response to enforcing the license. The content analytics module 228 is configured to generate content metrics, such as content consumption/creation metrics to identify the particular content consumed, the number of times a particular content is accessed, content ratings, content sharing activity, and other content metrics. The content metrics may be used by the content module 226 to enforce the license.

The feedback module 232 is configured to capture feedback data generated by the feedback sensors 156 of the mediated reality listener 104 and securely send the feedback data to the mediated reality server 102. The feedback data is protected by the back-channel encryption key. The feedback data may be indicative of an emotion of the user of the mediated reality listener 104. For example, the feedback data may include sensor data indicative of a facial expression of the user. In some embodiments, the feedback data may include content metrics captured by the content analytics module 228.

As shown, the attestation module 222, the key management module 224, the content module 226, and the content analytics module 228 may be secured by a trusted execution environment 236. The trusted execution environment 236 may be embodied as any isolated, authenticated, or otherwise secure execution environment provided by the mediated reality listener 104, and may be protected by one or more hardware features of the mediated reality listener 104. The trusted execution environment 236 may also provide secure storage for encryption keys, license data, and other sensitive data. In some embodiments, the trusted execution environment 236 may be hosted or otherwise provided by a hardware component such as a converged security and manageability engine (CSME), security engine, trusted platform module (TPM), or other hardware component of the mediated reality listener 104 that is independent of the processor 140. Additionally or alternatively, in some embodiments the trusted execution environment 236 may be embodied as a secure environment established by the processor 140, such as a secure enclave established using secure enclave support of the processor 140, such as Intel® Software Guard Extensions (SGX) technology, a secure world established using ARM® TrustZone® technology, or other secure execution environment.

Still referring to FIG. 2, in the illustrative embodiment, a mediated reality creator 106 establishes an environment 240 during operation. The illustrative environment 240 includes an attestation module 242, a key management module 244, a content module 246, a content analytics module 248, a communication module 250, and a feedback module 252. The various modules of the environment 240 may be embodied as hardware, firmware, software, or a combination thereof. As such, in some embodiments, one or more of the modules of the environment 240 may be embodied as circuitry or collection of electrical devices (e.g., attestation circuitry 242, key management circuitry 244, content circuitry 246, content analytics circuitry 248, communication circuitry 250, and/or feedback circuitry 252). It should be appreciated that, in such embodiments, one or more of the attestation circuitry 242, the key management circuitry 244, the content circuitry 246, the content analytics circuitry 248, the communication circuitry 250, and/or the feedback circuitry 252 may form a portion of one or more of the processor 160, the I/O subsystem 162, and/or other components of the mediated reality creator 106. Additionally, in some embodiments, one or more of the illustrative modules may form a portion of another module and/or one or more of the illustrative modules may be independent of one another.

The attestation module 242 is configured to provision the mediated reality creator 106 with the attestation credentials 254 and to perform an attestation procedure with the mediated reality server 102 based on the attestation credentials 254 after provisioning. Provisioning the mediated reality creator 106 with the attestation credentials 254 may include, for example, the manufacturer of the mediated reality creator 106 provisioning the mediated reality creator 106 with an enhanced privacy identifier (EPID) private key.

The key management module 244 is configured to securely provision a session encryption key to the mediated reality creator 106 from the mediated reality server 102 in response successfully performing the attestation procedure. The key management module 224 may be further configured to securely provision a back-channel encryption key to the mediated reality creator 106 from the mediated reality server 102 in response successfully performing the attestation procedure.

The content module 246 is configured to generate protected mediated reality content. As described above, the protected mediated reality content may be aggregated by the mediated reality server 102 and distributed to the mediated reality listeners 104. The communication module 250 is configured to securely send the protected mediated reality content and an associated license from the mediated reality creator 106 to the mediated reality server 102. The protected mediated reality content is protected by the corresponding session encryption key. The license defines one or more content usage restrictions for the associated protected mediated reality content.

The feedback module 252 is configured to securely receive aggregated feedback data from the mediated reality server 102. The aggregated feedback data is aggregated from feedback data generated by the mediated reality listeners 104. The aggregated feedback data is protected by the back-channel encryption key. As described above, the aggregated feedback data may be indicative of an emotion of a user of a mediated reality listener 104. The content analytics module 248 is configured to receive aggregated content metrics from the mediated reality server 102, such as content consumption/creation metrics to identify the particular content consumed, the number of times a particular content is accessed, content ratings, content sharing activity, and other content metrics.

As shown, the attestation module 242, the key management module 244, the content module 246, and the content analytics module 248 may be secured by a trusted execution environment 256. The trusted execution environment 256 may be embodied as any isolated, authenticated, or otherwise secure execution environment provided by the mediated reality creator 106, and may be protected by one or more hardware features of the mediated reality creator 106. The trusted execution environment 256 may also provide secure storage for encryption keys, license data, and other sensitive data. In some embodiments, the trusted execution environment 256 may be hosted or otherwise provided by a hardware component such as a converged security and manageability engine (CSME), security engine, trusted platform module (TPM), or other hardware component of the mediated reality creator 106 that is independent of the processor 160. Additionally or alternatively, in some embodiments the trusted execution environment 256 may be embodied as a secure environment established by the processor 120, such as a secure enclave established using secure enclave support of the processor 160, such as Intel® Software Guard Extensions (SGX) technology, a secure world established using ARM® TrustZone® technology, or other secure execution environment.

Figure 3:
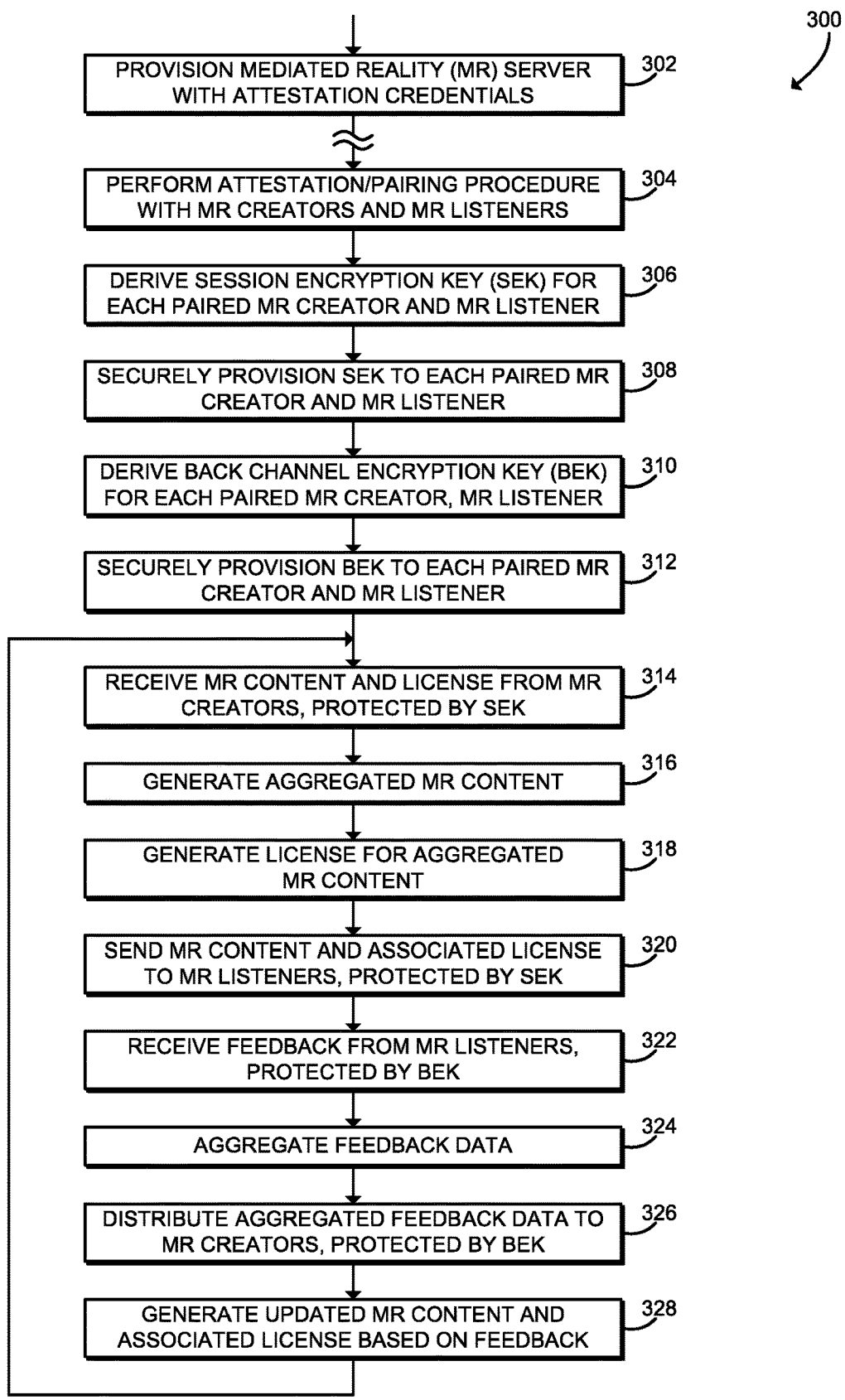
FIG. 3 is a simplified flow diagram of at least one embodiment of a method for secure MR content publishing that may be executed by the mediated reality server of FIGS. 1 and 2.

Referring now to FIG. 3, in use, the mediated reality server 102 may execute a method 300 for securely publishing mediated reality content. It should be appreciated that, in some embodiments, the method 300 may be embodied as various instructions stored on a computer-readable media, which may be executed by the processor 120 and/or other components of the mediated reality server 102 to cause the mediated reality server 102 to perform the method 300. The computer-readable media may be embodied as any type of media capable of being read by the mediated reality server 102 including, but not limited to, the memory 124, the data storage device 126, other memory or data storage devices of the mediated reality server 102, portable media readable by a peripheral device of the mediated reality server 102, and/or other media.

The method 300 begins with block 302, in which the mediated reality server 102 is provisioned with attestation credentials 216. The mediated reality server 102 may be provisioned with credentials that may be used to verify the mediated reality listeners 104 and/or the mediated reality creators 106. For example, the mediated reality server 102 may be provisioned with one or more enhanced privacy identifier (EPID) public keys that may be used to verify the attestation credentials 234, 254 of the mediated reality listeners 104 and the mediated reality creators 106, respectively. The mediated reality server 102 may be provisioned ahead of time, for example during manufacturing or when initially provisioned.

In block 304, the mediated reality server 102 performs an attestation/pairing procedure with each of the mediated reality listeners 104 and the mediated reality creators 106 using the pre-provisioned attestation credentials 234, 254, respectively. The attestation/pairing process verifies that each of the mediated reality listeners 104 and/or the mediated reality creators 106 includes digital rights management (DRM)-compliant mediated reality playback system. For example, the attestation/pairing process may verify a trusted execution environment (TEE) of each of the mediated reality listeners 104 and/or the mediated reality creators 106. The mediated reality server 102 may use any technique to perform attestation and/or pairing. The mediated reality server 102 may perform a secure key exchange (e.g., a Diffie-Hellman key exchange) to establish a secure channel with each mediated reality listener 104 and mediated reality creator 106 and use the secure channel to verify the attestation credentials 234, 254. For example, the mediated reality server 102 may verify an enhanced privacy identifier (EPID) private key that has been provisioned to each of the mediated reality listeners 104 and/or the mediated reality creators 106. Additionally or alternatively, in some embodiments the attestation procedure may be combined with other hardware-based security techniques such as multi-factor authentication to bind the mediated reality experience to particular users and/or geographies.

In block 306, the mediated reality server 102 derives a session encryption key (SEK) for each paired mediated reality listener 104 and mediated reality creator 106. The SEK may be embodied as a symmetric encryption key, and a unique SEK may be derived for each mediated reality listener 104 and mediated reality creator 106. In block 308, the mediated reality server 102 securely provisions the corresponding SEK to reach paired mediated reality listener 104 and mediated reality creator 106. The SEK may be provisioned, for example, using a secure channel established during attestation as described above in connection with block 304. As another example, a device key may be provisioned after attestation using the secure channel, and the SEK may be delivered via the dynamic provisioned device key.

Similarly, in block 310, the mediated reality server 102 derives a back-channel encryption key (BEK) for each paired mediated reality listener 104 and mediated reality creator 106. The BEK may be embodied as a symmetric encryption key, and a unique BEK may be derived for each mediated reality listener 104 and mediated reality creator 106. In block 312, the mediated reality server 102 securely provisions the corresponding BEK to reach paired mediated reality listener 104 and mediated reality creator 106. The BEK may be provisioned, for example, using a secure channel established during attestation as described above in connection with block 304. As another example, a device key may be provisioned after attestation using the secure channel, and the BEK may be delivered via the dynamic provisioned device key.

In block 314, the mediated reality server 102 receives mediated reality (MR) content and an associated DRM license from the mediated reality creators 106. The MR content may be embodied as a high-value content stream such as live video content, natural or MR ambience content, high-quality video streams, or other protected content. The MR content may be encrypted or otherwise protected by the SEK corresponding to each of the mediated reality creators 106. The corresponding DRM license may describe one or more content usage restrictions that are to be enforced for the MR content. Thus, each mediated reality creator 106 may specify a usage and/or redistribution policy for its associated MR content by providing the associated DRM license.

In block 316, the mediated reality server 102 securely generates aggregated MR content based on the MR content received from the mediated reality creators 106. For example, the mediated reality server 102 may composite or otherwise combine MR content from the mediated reality creators 106 to generate aggregated MR content. The mediated reality server 102 may also perform related media tasks such as encoding, decoding, transcoding, rendering and otherwise processing the media streams. The mediated reality server 102 may, for example, combine live video content received from a mediated reality creator 106 (e.g., a celebrity interview feed) with MR ambience content received from a different mediated reality creator 106 (e.g. a virtual talk show set). As another example, the mediated reality server 102 may combine DRM-protected streaming video from a mediated reality creator 106 with a virtual reality environment from a different mediated reality creator 106 (e.g., a virtual living room). As another example, the mediated reality server 102 may incorporate a live video stream update from a mediated reality creator 106 into a virtual reality experience provide by a different mediated reality creator 106 to provide a non-obtrusive notification of the updated content. Aggregation of the MR content may be secured and otherwise protected by the trusted execution environment 218 of the mediated reality server 102. In some embodiments, secure aggregation of the MR content may be performed partially or completely by one or more hardware components of the mediated reality server 102, such as by a graphics processor unit (GPU), processor graphics, or other graphical processing hardware. Thus, the aggregation of the MR content may be resistant to unauthorized access and other tampering.

In block 318, the mediated reality server 102 generates a DRM license for the aggregated MR content. The license for the aggregated MR content may describe one or more content usage restrictions that are to be enforced for the aggregated MR content by the mediated reality listeners 104. The license may be generated by combining the requirements of the licenses provided by each of the mediated reality creators 106. For example, the license for the aggregated MR content may include the most-restrictive content restrictions of the licenses provided by the mediated reality creators 106. The mediated reality server 102 may encrypt the MR content or otherwise bind the MR content to the DRM license.

In block 320, the mediated reality server 102 securely sends the aggregated MR content and the associated license to the mediated reality listeners 104. The aggregated MR content is protected by the SEK previously provisioned to each of the mediated reality listeners 104. For example, the aggregated MR content may be encrypted using a mash-up content key (MCK) to generate encrypted content. The MCK may be encrypted with the SEK corresponding to each of the mediated reality listeners 104, and the encrypted content may be transmitted to the mediated reality listeners 104 along with the corresponding encrypted MCK. Thus, the same MCK may be used for all of the mediated reality listeners 104. In some embodiments, the mediated reality server 102 selects the mediated reality listeners 104 and/or the aggregated MR content for transmission based on a publisher-subscriber policy. For example, the mediated reality server 102 may transmit aggregated MR content from the mediated reality creators 106 that have been followed or otherwise designated by a particular mediated reality listener 104.

In block 322, the mediated reality server 102 securely receives feedback data from the mediated reality listeners 104. The feedback data is protected by the BEK previously provisioned to each of the mediated reality listeners 104. The feedback data may be generated by the feedback sensors 156 of the mediated reality listeners 104, and may be indicative of the emotions, sentiment, or other response of the users of the mediated reality listeners 104. In some embodiments, the feedback data may include content metrics generated by the mediated reality listeners 104. The content metrics may be indicative of consumption/creation metrics such as the particular content consumed, the number of times a particular content is accessed, content ratings, content sharing activity, and/or other content metrics. In block 324, the mediated reality server 102 aggregates the feedback data received from the mediated reality listeners 104 to generate aggregated feedback data. The mediated reality server 102 may perform any aggregation operation on the feedback data, such as classification of feedback, feedback ranking, generating a recommendation based on the feedback data, or other operation.

In block 326, the mediated reality server 102 securely distributes the aggregated feedback data to the appropriate mediated reality creators 106. The feedback data is protected by the BEK previously provisioned to each of the mediated reality creators 106. The mediated reality server 102 may provide the aggregated feedback data in any appropriate format.

In block 328, the mediated reality server 102 may generate updated MR content and an associated license based on the feedback data. The updated MR content may be modified to incorporate or otherwise visualize feedback data received from particular mediated reality listeners 104 and/or the aggregated feedback data. For example, in some embodiments captured video content or other protected content produced by a mediated reality listener 104 may be incorporated into the aggregated MR content. In those embodiments, the license may be generated based on license data provided by the associated mediated reality listeners 104. As another example, one or more features of the mediated reality content may be modified based on the aggregated feedback data. For example, a wall, a lamp, or other MR object may change appearance (e.g., color) based on the aggregated user emotion, sentiment, or other response determined from the feedback data. After receiving feedback and potentially modifying the MR content, the method 300 loops back to block 314 to continue aggregating and distributing MR content.

Figure 4:
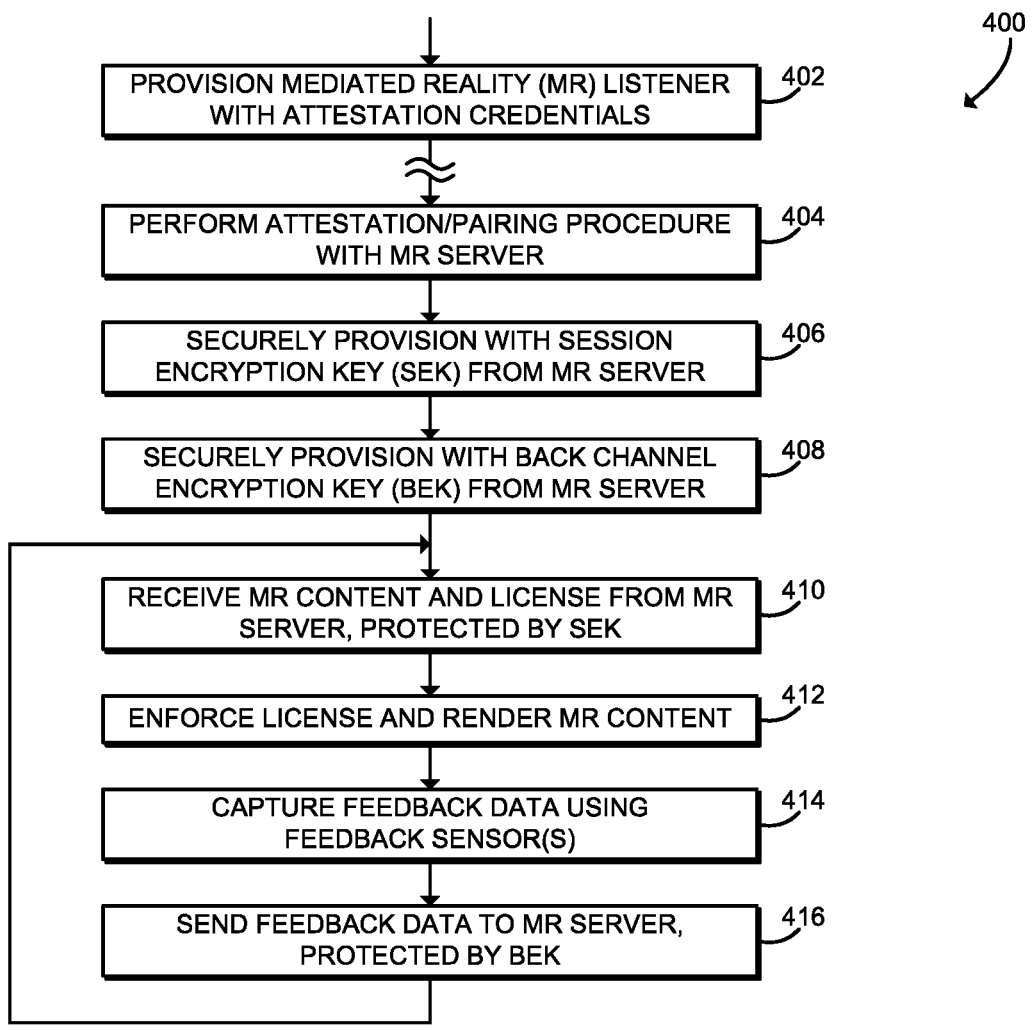
FIG. 4 is a simplified flow diagram of at least one embodiment of a method for secure MR content consumption that may be executed by a mediated reality listener of the system of FIGS. 1 and 2.

Referring now to FIG. 4, in use, a mediated reality listener 104 may execute a method 400 for securely consuming mediated reality content. It should be appreciated that, in some embodiments, the method 400 may be embodied as various instructions stored on a computer-readable media, which may be executed by the processor 140 and/or other components of the mediated reality listener 104 to cause the mediated reality listener 104 to perform the method 400. The computer-readable media may be embodied as any type of media capable of being read by the mediated reality listener 104 including, but not limited to, the memory 144, the data storage device 146, other memory or data storage devices of the mediated reality listener 104, portable media readable by a peripheral device of the mediated reality listener 104, and/or other media.

The method 400 begins with block 402, in which the mediated reality listener 104 is provisioned with the attestation credentials 234. The mediated reality listener 104 may be provisioned with credentials that may be used to verify the mediated reality listener 104 to the mediated reality server 102. For example, the mediated reality listener 104 may be provisioned with an enhanced privacy identifier (EPID) private key. The mediated reality listener 104 may be provisioned ahead of time, for example during manufacturing or when initially provisioned.

In block 404, the mediated reality listener 104 performs an attestation/pairing procedure with the mediated reality server 102 using the pre-provisioned attestation credentials 234. The attestation/pairing process verifies that the mediated reality listener 104 includes a digital rights management (DRM)-compliant mediated reality playback system. For example, the attestation/pairing process may verify a trusted execution environment (TEE) 234 of the mediated reality listener 104. The mediated reality listener 104 may use any technique to perform attestation and/or pairing. The mediated reality listener 104 may perform a secure key exchange (e.g., a Diffie-Hellman key exchange) to establish a secure channel with mediated reality server 102, and use the secure channel to verify the attestation credentials 234. For example, the mediated reality server 102 may verify an enhanced privacy identifier (EPID) private key that has been provisioned to the mediated reality listener 104.

In block 406, the mediated reality listener 104 is securely provisioned with a session encryption key (SEK) from the mediated reality server 102. The SEK may be provisioned, for example, using a secure channel established during attestation as described above in connection with block 404. As another example, a device key may be provisioned after attestation using the secure channel, and the SEK may be delivered via the dynamic provisioned device key. Similarly, in block 408 the mediated reality listener 104 is securely provisioned with a back-channel encryption key (BEK) from the mediated reality server 102. The BEK may be provisioned, for example, using a secure channel established during attestation as described above in connection with block 404. As another example, a device key may be provisioned after attestation using the secure channel, and the BEK may be delivered via the dynamic provisioned device key.

In block 410, the mediated reality listener 104 receives mediated reality (MR) content and an associated license from the mediated reality server 102. The MR content is protected by the SEK previously provisioned to the mediated reality listener 104. As described above, the MR content received from the mediated reality server 102 may include aggregated MR content created by multiple mediated reality creators 106. In some embodiments, the mediated reality server 102 may aggregate MR content from mediated reality creators 106 based on a publisher-subscriber policy. For example, the mediated reality server 102 may transmit aggregated MR content from the mediated reality creators 106 that have been followed or otherwise designated by the mediated reality listener 104.

In block 412, the mediated reality listener 104 enforces the license and renders the MR content. As described above, the license may describe one or more content usage restrictions that are to be enforced for the aggregated MR content by the mediated reality listener 104. The mediated reality listener 104 may enforce the license by evaluating the content usage restrictions and determining whether to allow the MR content to be decrypted or otherwise accessed. To render the MR content, the mediated reality listener 104 may decrypt the MR content and output it using the display 150 and/or other appropriate output devices. For example, the mediated reality listener 104 may use the SEK to decrypt an encrypted mash-up content key (MCK) received from the mediated reality server 102, and then use the MCK to decrypt the MR content. The MR content may include virtual reality content, augmented reality content, high-value video streams, or other content aggregated by the mediated reality server 102. The enforcement of the license and/or the rendering of the MR content may be secured and otherwise protected by the trusted execution environment 236 of the mediated reality listener 104 in a tamper resistant manner using Intel® Protected Audio Video Path (PAVP), ARM® TrustZone®, or other secure execution and/or media playback environment.

In block 414, the mediated reality listener 104 captures feedback data from the feedback sensors 156. The feedback data is indicative of the emotions, sentiment, or other response of the user of the mediated reality listener 104. For example, a facial recognition camera 156 may capture feedback data indicative of the user's current facial expression. As another example, a biometric sensor 156 such as a heart rate sensor, a galvanic skin response sensor, and/or an electroencephalograph sensor may capture feedback data indicative of the user's emotional response. In block 416, the mediated reality listener 104 sends the feedback data to the mediated reality server 102, protected by the BEK. For example, the feedback data may be encrypted by the BEK or using a symmetric key derived from or protected by the BEK. After providing the back-channel feedback data, the method 400 loops back to block 410 to continue receiving protected MR content. As described above, the MR content may be modified to reflect the contents of the feedback data.

Figure 5:
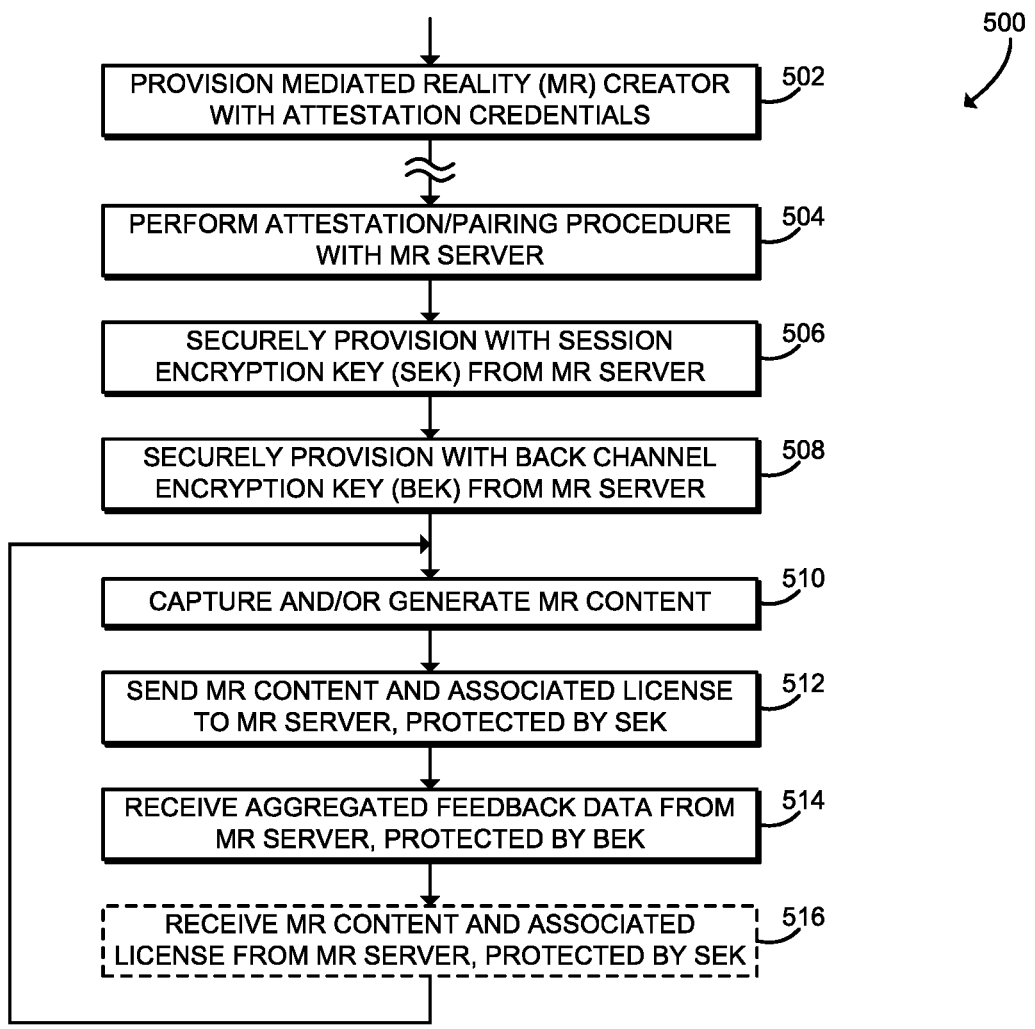
FIG. 5 is a simplified flow diagram of at least one embodiment of a method for secure MR content creation that may be executed by a mediated reality creator of the system of FIGS. 1 and 2.

Referring now to FIG. 5, in use, a mediated reality creator 106 may execute a method 500 for securely creating mediated reality content. It should be appreciated that, in some embodiments, the method 500 may be embodied as various instructions stored on a computer-readable media, which may be executed by the processor 160 and/or other components of the mediated reality creator 106 to cause the mediated reality creator 106 to perform the method 500. The computer-readable media may be embodied as any type of media capable of being read by the mediated reality creator 106 including, but not limited to, the memory 164, the data storage device 166, other memory or data storage devices of the mediated reality creator 106, portable media readable by a peripheral device of the mediated reality creator 106, and/or other media.

The method 500 begins with block 502, in which the mediated reality creator 106 is provisioned with the attestation credentials 254. The mediated reality creator 106 may be provisioned with credentials that may be used to verify the mediated reality creator 106 to the mediated reality server 102. For example, the mediated reality creator 106 may be provisioned with an enhanced privacy identifier (EPID) private key. The mediated reality creator 106 may be provisioned ahead of time, for example during manufacturing or when initially provisioned.

In block 504, the mediated reality creator 106 performs an attestation/pairing procedure with the mediated reality server 102 using the pre-provisioned attestation credentials 254. The attestation/pairing process verifies that the mediated reality creator 106 includes a digital rights management (DRM)-compliant mediated reality system. For example, the attestation/pairing process may verify a trusted execution environment (TEE) 254 of the mediated reality creator 106. The mediated reality creator 106 may use any technique to perform attestation and/or pairing. The mediated reality creator 106 may perform a secure key exchange (e.g., a Diffie-Hellman key exchange) to establish a secure channel with mediated reality server 102, and use the secure channel to verify the attestation credentials 254. For example, the mediated reality server 102 may verify an enhanced privacy identifier (EPID) private key that has been provisioned to the mediated reality creator 106.

In block 506, the mediated reality creator 106 is securely provisioned with a session encryption key (SEK) from the mediated reality server 102. The SEK may be provisioned, for example, using a secure channel established during attestation as described above in connection with block 504. As another example, a device key may be provisioned after attestation using the secure channel, and the SEK may be delivered via the dynamic provisioned device key. Similarly, in block 508 the mediated reality creator 106 is securely provisioned with a back-channel encryption key (BEK) from the mediated reality server 102. The BEK may be provisioned, for example, using a secure channel established during attestation as described above in connection with block 504. As another example, a device key may be provisioned after attestation using the secure channel, and the BEK may be delivered via the dynamic provisioned device key.

In block 510, the mediated reality creator 106 captures or otherwise generates mediated reality (MR) content. As described above, the MR content may be embodied as a high-value content stream such as live video content, natural or MR ambience content, high-quality video streams, or other protected content. The mediated reality creator 106 may capture the MR content using, for example, the camera 172, audio sensor 174, and/or other media capture devices.

In block 512, the mediated reality creator 106 sends the MR content and an associated license to the mediated reality server 102. The MR content is encrypted or otherwise protected by the SEK previously provisioned to the mediated reality creator 106. The associated license may describe one or more content usage restrictions that are to be enforced for the MR content. Thus, the mediated reality creator 106 may specify a usage and/or redistribution policy for the MR content using the associated license. As described above, the mediated reality server 102 may aggregate the MR content with MR content from other mediated reality creators 106 and broadcast the aggregated content securely to the mediated reality listeners 104.

In block 514, the mediated reality creator 106 receives feedback data from the mediated reality server 102. The feedback data is protected by the BEK previously provisioned to the mediated reality creator 106. As described above, the aggregated feedback data may be indicative of feedback data captured by one or more mediated reality listeners 104 using associated feedback sensors 156. The feedback data may be indicative of the emotions, sentiment, or other response of users of the mediated reality listeners 104. The mediated reality creator 106 may present the aggregated feedback data to a user of the mediated reality creator 106 (e.g., a celebrity or other content producer) in any appropriate format.

In some embodiments, in block 516 the mediated reality creator 106 may receive mediated reality (MR) content and an associated license from the mediated reality server 102.

The MR content is protected by the SEK previously provisioned to the mediated reality creator 106. As described above, the mediated reality server 102 may update or otherwise modify the MR content based on the feedback data received from the mediated reality listeners 104. The mediated reality server 102 may send the updated MR content to the mediated reality creator 106. After receiving the feedback data and/or the MR content, the method 500 loops back to block 510 to continue capturing MR content.

EXAMPLES

Illustrative examples of the technologies disclosed herein are provided below. An embodiment of the technologies may include any one or more, and any combination of, the examples described below.

Example 1 includes a computing device for secure mediated reality content publishing, the computing device comprising: an attestation module to perform an attestation procedure with a mediated reality listener based on a pre-provisioned attestation credential of the mediated reality listener; a key management module to securely provision a session encryption key to the mediated reality listener in response to performance of the attestation procedure; a composition module to generate aggregated mediated reality content based on protected mediated reality content received from each of a plurality of mediated reality creators; a license management module to generate, by a trusted execution environment of the computing device, a first license associated with the aggregated mediated reality content based on a plurality of licenses associated with the protected mediated reality content, wherein the first license defines one or more content usage restrictions for the aggregated mediated reality content; and a communication module to securely send the aggregated mediated reality content and the first license to the mediated reality listener, wherein the aggregated mediated reality content is protected by the session encryption key.

Example 2 includes the subject matter of Example 1, and wherein: to perform the attestation procedure comprises to (i) verify authenticity of the mediated reality listener with the attestation credential of the mediated reality listener and (ii) establish a secure communication channel between the computing device and the mediated reality listener in response to verification of the authenticity of the mediated reality listener; and to securely provision the session encryption key comprises to securely provision the session encryption key to the mediated reality listener via the secure communication channel.

Example 3 includes the subject matter of any of Examples 1 and 2, and wherein to perform the attestation procedure comprises to perform a secure key exchange between the computing device and the mediated reality listener.

Example 4 includes the subject matter of any of Examples 1-3, and wherein the pre-provisioned attestation credential of the mediated reality listener comprises an enhanced privacy identifier private key provisioned to the mediated reality listener by a manufacturer of the mediated reality listener.

Example 5 includes the subject matter of any of Examples 1-4, and wherein: the attestation module is further to perform an attestation procedure with a mediated reality creator based on a pre-provisioned attestation credential of the mediated reality creator; and the key management module is further to securely provision a second session encryption key to the mediated reality creator in response to the performance of the attestation procedure; wherein the protected mediated reality content received from the mediated reality creator is protected by the second session encryption key.

Example 6 includes the subject matter of any of Examples 1-5, and wherein the key management module is further to derive the session encryption key for the mediated reality listener in response to the performance of the attestation procedure.

Example 7 includes the subject matter of any of Examples 1-6, and wherein to generate the aggregated mediated reality content comprises to composite the protected mediated reality content received from the plurality of mediated reality creators.

Example 8 includes the subject matter of any of Examples 1-7, and wherein to generate the aggregated mediated reality content comprises to generate, by the trusted execution environment of the computing device, the aggregated mediated reality content based on the protected mediated reality content.

Example 9 includes the subject matter of any of Examples 1-8, and further comprising a feedback module to: receive feedback data from the mediated reality listener, wherein the feedback data is generated by one or more feedback sensors of the mediated reality listener, and wherein the feedback data is protected by a back-channel encryption key; wherein the key management module is further to securely provision the back-channel encryption key to the mediated reality listener in response to the performance of the attestation procedure.

Example 10 includes the subject matter of any of Examples 1-9, and wherein the feedback data further comprises content metric data generated by the mediated reality listener.

Example 11 includes the subject matter of any of Examples 1-10, and wherein the feedback module is further to modify the aggregated mediated reality content based on the feedback data in response to receipt of the feedback data from the mediated reality listener.

Example 12 includes the subject matter of any of Examples 1-11, and wherein the feedback data is indicative of an emotion of a user of the mediated reality listener.

Example 13 includes the subject matter of any of Examples 1-12, and wherein the feedback module is further to aggregate the feedback data with feedback data received from one or more other mediated reality listeners to generate aggregated feedback data.

Example 14 includes the subject matter of any of Examples 1-13, and wherein: the attestation module is further to perform an attestation procedure with a mediated reality creator based on a pre-provisioned attestation credential of the mediated reality creator; the key management module is further to securely provision a second back-channel encryption key to the mediated reality creator in response to performance of the attestation procedure; and the feedback module is further to send the aggregated feedback data to the mediated reality creator, wherein the aggregated feedback data is protected by the second back-channel encryption key.

Example 15 includes the subject matter of any of Examples 1-14, and wherein the key management module is further to derive the back channel encryption key for the mediated reality listener in response to the performance of the attestation procedure.

Example 16 includes the subject matter of any of Examples 1-15, and wherein to securely send the aggregated mediated reality content to the mediated reality listener comprises to: encrypt the aggregated mediated reality content with a mash-up content key to generate encrypted aggregated mediated reality content; encrypt the mash-up content key with the session encryption key to generate an encrypted mash-up content key; and send the encrypted aggregated mediated reality content and the encrypted mash-up content key to the mediated reality listener.

Example 17 includes the subject matter of any of Examples 1-16, and wherein the communication module is further to receive the protected mediated reality content and the associated plurality of licenses from the plurality of mediated reality creators, wherein the protected mediated reality content is encrypted and wherein each of the plurality of licenses defines one or more content usage restrictions for the associated protected mediated reality content.

Example 18 includes a computing device for secure mediated reality content consumption, the computing device comprising: an attestation module to (i) provision the computing device with an attestation credential and (ii) perform, response to a provisioning of the computing device with the attestation credential, an attestation procedure with a mediated reality server based on the attestation credential; a key management module to securely provision a session encryption key to the computing device from the mediated reality server in response to performance of the attestation procedure; a communication module to securely receive aggregated mediated reality content and a first license from the mediated reality server, wherein the aggregated mediated reality content is based on protected mediated reality content created by a plurality of mediated reality creators, wherein the aggregated mediated reality is protected by the session encryption key, and wherein the first license defines one or more content usage restrictions for the aggregated mediated reality content; and a content module to (i) enforce, by a trusted execution environment of the computing device, the first license, and (ii) render the aggregated mediated reality content in response to enforcement of the first license.

Example 19 includes the subject matter of Example 18, and wherein: to perform the attestation procedure comprises to (i) verify authenticity of the trusted execution environment of the computing device with the attestation credential, and (ii) establish a secure communication channel between the computing device and the mediated reality server in response to verification of the authenticity of the computing device; and to securely provision the session encryption key comprises to securely provision the session encryption key to the computing device via the secure communication channel.

Example 20 includes the subject matter of any of Examples 18 and 19, and wherein to perform the attestation procedure comprises to perform a secure key exchange between the computing device and the mediated reality server.

Example 21 includes the subject matter of any of Examples 18-20, and wherein to provision the computing device with the attestation credential comprises to provision, by a manufacturer of the computing device, the computing device with an enhanced privacy identifier private key.

Example 22 includes the subject matter of any of Examples 18-21, and further comprising a feedback module to: capture feedback data generated by one or more feedback sensors of the computing device; and securely send the feedback data to the mediated reality server, wherein the feedback data is protected by a back-channel encryption key; wherein the key management module is further to securely provision a back-channel encryption key to the computing device from the mediated reality server in response to the performance of the attestation procedure.

Example 23 includes the subject matter of any of Examples 18-22, and wherein the feedback data is indicative of an emotion of a user of the computing device.

Example 24 includes the subject matter of any of Examples 18-23, and wherein to capture the feedback data comprises to capture sensor data indicative of a facial expression of the user.

Example 25 includes the subject matter of any of Examples 18-24, and further comprising a content analytics module to generate content metric data, wherein the feedback data further comprises the content metric data.

Example 26 includes the subject matter of any of Examples 18-25, and wherein to render the aggregated mediated reality content in response to enforcement of the first license comprises to: decrypt an encrypted mash-up content key received from the mediated reality server with the session encryption key to generate a mash-up content key; and decrypt the aggregated mediated reality content received from the mediated reality server with the mash-up key to generate decrypted aggregated mediated reality content.

Example 27 includes a computing device for secure mediated reality content creation, the computing device comprising: an attestation module to (i) provision the computing device with an attestation credential and (ii) perform, in response to a provisioning of the computing device with the attestation credential, an attestation procedure with a mediated reality server based on the attestation credential; a key management module to securely provision a session encryption key to the computing device from the mediated reality server in response to performance of the attestation procedure; a content module to generate protected mediated reality content; and a communication module to securely send the protected mediated reality content and an associated license from the computing device to the mediated reality server, wherein the protected mediated reality content is protected by the session encryption key and the license defines one or more content usage restrictions for the associated protected mediated reality content.

Example 28 includes the subject matter of Example 27, and wherein: to perform the attestation procedure comprises to (i) verify authenticity of the computing device with the attestation credential and (ii) establish a secure communication channel between the computing device and the mediated reality server in response to verification of the authenticity of the computing device; and to securely provision the session encryption key comprises to securely provision the session encryption key to the computing device via the secure communication channel.

Example 29 includes the subject matter of any of Examples 27 and 28, and wherein to perform the attestation procedure comprises to perform a secure key exchange between the computing device and the mediated reality server.

Example 30 includes the subject matter of any of Examples 27-29, and wherein to provision the computing device with the attestation credential comprises to provision, by a manufacturer of the computing device, the computing device with an enhanced privacy identifier private key.

Example 31 includes the subject matter of any of Examples 27-30, and further comprising a feedback module to: securely receive aggregated feedback data from the mediated reality server, wherein the aggregated feedback data is aggregated from feedback data generated by a plurality of mediated reality listeners, and wherein the aggregated feedback data is protected by a back-channel encryption key; wherein the key management module is further to securely provision the back-channel encryption key to the computing device from the mediated reality server in response to the performance of the attestation procedure.

Example 32 includes the subject matter of any of Examples 27-31, and wherein the aggregated feedback data is indicative of an emotion of a user of a mediated reality listener.

Example 33 includes the subject matter of any of Examples 27-32, and wherein the feedback data further comprises aggregated content metric data generated by the plurality of mediated reality listeners.

Example 34 includes a method for secure mediated reality content publishing, the method comprising: performing, by a computing device, an attestation procedure with a mediated reality listener based on a pre-provisioned attestation credential of the mediated reality listener; securely provisioning, by the computing device, a session encryption key to the mediated reality listener in response to performing the attestation procedure; generating, by the computing device, aggregated mediated reality content based on protected mediated reality content received from each of a plurality of mediated reality creators; generating, by a trusted execution environment of the computing device, a first license associated with the aggregated mediated reality content based on a plurality of licenses associated with the protected mediated reality content, wherein the first license defines one or more content usage restrictions for the aggregated mediated reality content; and securely sending, by the computing device, the aggregated mediated reality content and the first license to the mediated reality listener, wherein the aggregated mediated reality content is protected by the session encryption key.

Example 35 includes the subject matter of Example 34, and wherein: performing the attestation procedure comprises (i) verifying authenticity of the mediated reality listener using the attestation credential of the mediated reality listener and (ii) establishing a secure communication channel between the computing device and the mediated reality listener in response to verifying the authenticity of the mediated reality listener; and securely provisioning the session encryption key comprises securely provisioning the session encryption key to the mediated reality listener via the secure communication channel.

Example 36 includes the subject matter of any of Examples 34 and 35, and wherein performing the attestation procedure comprises performing a secure key exchange between the computing device and the mediated reality listener.

Example 37 includes the subject matter of any of Examples 34-36, and wherein the pre-provisioned attestation credential of the mediated reality listener comprises an enhanced privacy identifier private key provisioned to the mediated reality listener by a manufacturer of the mediated reality listener.

Example 38 includes the subject matter of any of Examples 34-37, and further comprising: performing, by the computing device, an attestation procedure with a mediated reality creator based on a pre-provisioned attestation credential of the mediated reality creator; and securely provisioning, by the computing device, a second session encryption key to the mediated reality creator in response to performing the attestation procedure; wherein the protected mediated reality content received from the mediated reality creator is protected by the second session encryption key.

Example 39 includes the subject matter of any of Examples 34-38, and further comprising deriving, by the computing device, the session encryption key for the mediated reality listener in response to performing the attestation procedure.

Example 40 includes the subject matter of any of Examples 34-39, and wherein generating the aggregated mediated reality content comprises compositing the protected mediated reality content received from the plurality of mediated reality creators.

Example 41 includes the subject matter of any of Examples 34-40, and wherein generating the aggregated mediated reality content comprises generating, by the trusted execution environment of the computing device, the aggregated mediated reality content based on the protected mediated reality content.

Example 42 includes the subject matter of any of Examples 34-41, and further comprising: securely provisioning, by the computing device, a back-channel encryption key to the mediated reality listener in response to performing the attestation procedure; and receiving, by the computing device, feedback data from the mediated reality listener, wherein the feedback data is generated by one or more feedback sensors of the mediated reality listener, and wherein the feedback data is protected by the back-channel encryption key.

Example 43 includes the subject matter of any of Examples 34-42, and wherein the feedback data further comprises content metric data generated by the mediated reality listener.

Example 44 includes the subject matter of any of Examples 34-43, and further comprising modifying, by the computing device, the aggregated mediated reality content based on the feedback data in response to receiving the feedback data from the mediated reality listener.

Example 45 includes the subject matter of any of Examples 34-44, and wherein the feedback data is indicative of an emotion of a user of the mediated reality listener.

Example 46 includes the subject matter of any of Examples 34-45, and further comprising aggregating, by the computing device, the feedback data with feedback data received from one or more other mediated reality listeners to generate aggregated feedback data.

Example 47 includes the subject matter of any of Examples 34-46, and further comprising: performing, by the computing device, an attestation procedure with a mediated reality creator based on a pre-provisioned attestation credential of the mediated reality creator; securely provisioning, by the computing device, a second back-channel encryption key to the mediated reality creator in response to performing the attestation procedure; and sending, by the computing device, the aggregated feedback data to the mediated reality creator, wherein the aggregated feedback data is protected by the second back-channel encryption key.

Example 48 includes the subject matter of any of Examples 34-47, and further comprising deriving, by the computing device, the back channel encryption key for the mediated reality listener in response to performing the attestation procedure.

Example 49 includes the subject matter of any of Examples 34-48, and wherein securely sending the aggregated mediated reality content to the mediated reality listener comprises: encrypting the aggregated mediated reality content with a mash-up content key to generate encrypted aggregated mediated reality content; encrypting the mash-up content key with the session encryption key to generate an encrypted mash-up content key; and sending the encrypted aggregated mediated reality content and the encrypted mash-up content key to the mediated reality listener.

Example 50 includes the subject matter of any of Examples 34-49, and further comprising receiving, by the computing device, the protected mediated reality content and the associated plurality of licenses from the plurality of mediated reality creators, wherein the protected mediated reality content is encrypted and wherein each of the plurality of licenses defines one or more content usage restrictions for the associated protected mediated reality content.

Example 51 includes a method for secure mediated reality content consumption, the method comprising: provisioning a computing device with an attestation credential; performing, by the computing device in response to provisioning the computing device with the attestation credential, an attestation procedure with a mediated reality server based on the attestation credential of the computing device; securely provisioning, by the computing device, a session encryption key to the computing device from the mediated reality server in response to performing the attestation procedure; securely receiving, by the computing device, aggregated mediated reality content and a first license from the mediated reality server, wherein the aggregated mediated reality content is based on protected mediated reality content created by a plurality of mediated reality creators, wherein the aggregated mediated reality is protected by the session encryption key, and wherein the first license defines one or more content usage restrictions for the aggregated mediated reality content; enforcing, by a trusted execution environment of the computing device, the first license; and rendering, by the computing device, the aggregated mediated reality content in response to enforcing the first license.

Example 52 includes the subject matter of Example 51, and wherein: performing the attestation procedure comprises (i) verifying authenticity of the trusted execution environment of the computing device using the attestation credential and (ii) establishing a secure communication channel between the computing device and the mediated reality server in response to verifying the authenticity of the computing device; and securely provisioning the session encryption key comprises securely provisioning the session encryption key to the computing device via the secure communication channel.

Example 53 includes the subject matter of any of Examples 51 and 52, and wherein performing the attestation procedure comprises performing a secure key exchange between the computing device and the mediated reality server.

Example 54 includes the subject matter of any of Examples 51-53, and wherein provisioning the computing device with the attestation credential comprises provisioning, by a manufacturer of the computing device, the computing device with an enhanced privacy identifier private key.

Example 55 includes the subject matter of any of Examples 51-54, and further comprising: securely provisioning, by the computing device, a back-channel encryption key to the computing device from the mediated reality server in response to performing the attestation procedure; capturing, by the computing device, feedback data generated by one or more feedback sensors of the computing device; and securely sending, by the computing device, the feedback data to the mediated reality server, wherein the feedback data is protected by the back-channel encryption key.

Example 56 includes the subject matter of any of Examples 51-55, and wherein the feedback data is indicative of an emotion of a user of the computing device.

Example 57 includes the subject matter of any of Examples 51-56, and wherein capturing the feedback data comprises capturing sensor data indicative of a facial expression of the user.

Example 58 includes the subject matter of any of Examples 51-57, and further comprising generating, by the computing device, content metric data, wherein the feedback data further comprises the content metric data.

Example 59 includes the subject matter of any of Examples 51-58, and wherein rendering the aggregated mediated reality content in response to enforcing the first license comprises: decrypting an encrypted mash-up content key received from the mediated reality server with the session encryption key to generate a mash-up content key; and decrypting the aggregated mediated reality content received from the mediated reality server with the mash-up key to generate decrypted aggregated mediated reality content.

Example 60 includes a method for secure mediated reality content creation, the method comprising: provisioning a computing device with an attestation credential; performing, by the computing device in response to provisioning the computing device with the attestation credential, an attestation procedure with a mediated reality server based on the attestation credential of the computing device; securely provisioning, by the computing device, a session encryption key to the computing device from the mediated reality server in response to performing the attestation procedure; generating, by the computing device, protected mediated reality content; and securely sending, by the computing device, the protected mediated reality content and an associated license from the computing device to the mediated reality server, wherein the protected mediated reality content is protected by the session encryption key and the license defines one or more content usage restrictions for the associated protected mediated reality content.

Example 61 includes the subject matter of Example 60, and wherein: performing the attestation procedure comprises (i) verifying authenticity of the computing device using the attestation credential and (ii) establishing a secure communication channel between the computing device and the mediated reality server in response to verifying the authenticity of the computing device; and securely provisioning the session encryption key comprises securely provisioning the session encryption key to the computing device via the secure communication channel.

Example 62 includes the subject matter of any of Examples 60 and 61, and wherein performing the attestation procedure comprises performing a secure key exchange between the computing device and the mediated reality server.

Example 63 includes the subject matter of any of Examples 60-62, and wherein provisioning the computing device with the attestation credential comprises provisioning, by a manufacturer of the computing device, the computing device with an enhanced privacy identifier private key.

Example 64 includes the subject matter of any of Examples 60-63, and further comprising: securely provisioning, by the computing device, a back-channel encryption key to the computing device from the mediated reality server in response to performing the attestation procedure; and securely receiving, by the computing device, aggregated feedback data from the mediated reality server, wherein the aggregated feedback data is aggregated from feedback data generated by a plurality of mediated reality listeners, and wherein the aggregated feedback data is protected by the back-channel encryption key.

Example 65 includes the subject matter of any of Examples 60-64, and wherein the aggregated feedback data is indicative of an emotion of a user of a mediated reality listener.

Example 66 includes the subject matter of any of Examples 60-65, and wherein the feedback data further comprises aggregated content metric data generated by the plurality of mediated reality listeners.

Example 67 includes a computing device comprising: a processor; and a memory having stored therein a plurality of instructions that when executed by the processor cause the computing device to perform the method of any of Examples 34-66.

Example 68 includes one or more machine readable storage media comprising a plurality of instructions stored thereon that in response to being executed result in a computing device performing the method of any of Examples 34-66.

Example 69 includes a computing device comprising means for performing the method of any of Examples 34-66.

Example 70 includes a computing device for secure mediated reality content publishing, the computing device comprising: means for performing an attestation procedure with a mediated reality listener based on a pre-provisioned attestation credential of the mediated reality listener; means for securely provisioning a session encryption key to the mediated reality listener in response to performing the attestation procedure; means for generating aggregated mediated reality content based on protected mediated reality content received from each of a plurality of mediated reality creators; means for generating, by a trusted execution environment of the computing device, a first license associated with the aggregated mediated reality content based on a plurality of licenses associated with the protected mediated reality content, wherein the first license defines one or more content usage restrictions for the aggregated mediated reality content; and means for securely sending the aggregated mediated reality content and the first license to the mediated reality listener, wherein the aggregated mediated reality content is protected by the session encryption key.

Example 71 includes the subject matter of Example 70, and wherein: the means for performing the attestation procedure comprises (i) means for verifying authenticity of the mediated reality listener using the attestation credential of the mediated reality listener and (ii) means for establishing a secure communication channel between the computing device and the mediated reality listener in response to verifying the authenticity of the mediated reality listener; and the means for securely provisioning the session encryption key comprises means for securely provisioning the session encryption key to the mediated reality listener via the secure communication channel.

Example 72 includes the subject matter of any of Examples 70 and 71, and wherein the means for performing the attestation procedure comprises means for performing a secure key exchange between the computing device and the mediated reality listener.

Example 73 includes the subject matter of any of Examples 70-72, and wherein the pre-provisioned attestation credential of the mediated reality listener comprises an enhanced privacy identifier private key provisioned to the mediated reality listener by a manufacturer of the mediated reality listener.

Example 74 includes the subject matter of any of Examples 70-73, and further comprising: means for performing an attestation procedure with a mediated reality creator based on a pre-provisioned attestation credential of the mediated reality creator; and means for securely provisioning a second session encryption key to the mediated reality creator in response to performing the attestation procedure; wherein the protected mediated reality content received from the mediated reality creator is protected by the second session encryption key.

Example 75 includes the subject matter of any of Examples 70-74, and further comprising means for deriving the session encryption key for the mediated reality listener in response to performing the attestation procedure.

Example 76 includes the subject matter of any of Examples 70-75, and wherein the means for generating the aggregated mediated reality content comprises means for compositing the protected mediated reality content received from the plurality of mediated reality creators.

Example 77 includes the subject matter of any of Examples 70-76, and wherein the means for generating the aggregated mediated reality content comprises means for generating, by the trusted execution environment of the computing device, the aggregated mediated reality content based on the protected mediated reality content.

Example 78 includes the subject matter of any of Examples 70-77, and further comprising: means for securely provisioning a back-channel encryption key to the mediated reality listener in response to performing the attestation procedure; and means for receiving feedback data from the mediated reality listener, wherein the feedback data is generated by one or more feedback sensors of the mediated reality listener, and wherein the feedback data is protected by the back-channel encryption key.

Example 79 includes the subject matter of any of Examples 70-78, and wherein the feedback data further comprises content metric data generated by the mediated reality listener.

Example 80 includes the subject matter of any of Examples 70-79, and further comprising means for modifying the aggregated mediated reality content based on the feedback data in response to receiving the feedback data from the mediated reality listener.

Example 81 includes the subject matter of any of Examples 70-80, and wherein the feedback data is indicative of an emotion of a user of the mediated reality listener.

Example 82 includes the subject matter of any of Examples 70-81, and further comprising means for aggregating the feedback data with feedback data received from one or more other mediated reality listeners to generate aggregated feedback data.

Example 83 includes the subject matter of any of Examples 70-82, and further comprising: means for performing an attestation procedure with a mediated reality creator based on a pre-provisioned attestation credential of the mediated reality creator; means for securely provisioning a second back-channel encryption key to the mediated reality creator in response to performing the attestation procedure; and means for sending the aggregated feedback data to the mediated reality creator, wherein the aggregated feedback data is protected by the second back-channel encryption key.

Example 84 includes the subject matter of any of Examples 70-83, and further comprising means for deriving the back channel encryption key for the mediated reality listener in response to performing the attestation procedure.

Example 85 includes the subject matter of any of Examples 70-84, and wherein the means for securely sending the aggregated mediated reality content to the mediated reality listener comprises: means for encrypting the aggregated mediated reality content with a mash-up content key to generate encrypted aggregated mediated reality content; means for encrypting the mash-up content key with the session encryption key to generate an encrypted mash-up content key; and means for sending the encrypted aggregated mediated reality content and the encrypted mash-up content key to the mediated reality listener.

Example 86 includes the subject matter of any of Examples 70-85, and further comprising means for receiving the protected mediated reality content and the associated plurality of licenses from the plurality of mediated reality creators, wherein the protected mediated reality content is encrypted and wherein each of the plurality of licenses defines one or more content usage restrictions for the associated protected mediated reality content.

Example 87 includes a computing device for secure mediated reality content consumption, the computing device comprising: means for provisioning a computing device with an attestation credential; means for performing, in response to provisioning the computing device with the attestation credential, an attestation procedure with a mediated reality server based on the attestation credential of the computing device; means for securely provisioning a session encryption key to the computing device from the mediated reality server in response to performing the attestation procedure; means for securely receiving aggregated mediated reality content and a first license from the mediated reality server, wherein the aggregated mediated reality content is based on protected mediated reality content created by a plurality of mediated reality creators, wherein the aggregated mediated reality is protected by the session encryption key, and wherein the first license defines one or more content usage restrictions for the aggregated mediated reality content; means for enforcing, by a trusted execution environment of the computing device, the first license; and means for rendering the aggregated mediated reality content in response to enforcing the first license.

Example 88 includes the subject matter of Example 87, and wherein: the means for performing the attestation procedure comprises (i) means for verifying authenticity of the trusted execution environment of the computing device using the attestation credential and (ii) means for establishing a secure communication channel between the computing device and the mediated reality server in response to verifying the authenticity of the computing device; and the means for securely provisioning the session encryption key comprises means for securely provisioning the session encryption key to the computing device via the secure communication channel.

Example 89 includes the subject matter of any of Examples 87 and 88, and wherein the means for performing the attestation procedure comprises means for performing a secure key exchange between the computing device and the mediated reality server.

Example 90 includes the subject matter of any of Examples 87-89, and wherein the means for provisioning the computing device with the attestation credential comprises means for provisioning, by a manufacturer of the computing device, the computing device with an enhanced privacy identifier private key.

Example 91 includes the subject matter of any of Examples 87-90, and further comprising: means for securely provisioning a back-channel encryption key to the computing device from the mediated reality server in response to performing the attestation procedure; means for capturing feedback data generated by one or more feedback sensors of the computing device; and means for securely sending the feedback data to the mediated reality server, wherein the feedback data is protected by the back-channel encryption key.

Example 92 includes the subject matter of any of Examples 87-91, and wherein the feedback data is indicative of an emotion of a user of the computing device.

Example 93 includes the subject matter of any of Examples 87-92, and wherein the means for capturing the feedback data comprises means for capturing sensor data indicative of a facial expression of the user.

Example 94 includes the subject matter of any of Examples 87-93, and further comprising means for generating content metric data, wherein the feedback data further comprises the content metric data.

Example 95 includes the subject matter of any of Examples 87-94, and wherein the means for rendering the aggregated mediated reality content in response to enforcing the first license comprises: means for decrypting an encrypted mash-up content key received from the mediated reality server with the session encryption key to generate a mash-up content key; and means for decrypting the aggregated mediated reality content received from the mediated reality server with the mash-up key to generate decrypted aggregated mediated reality content.

Example 96 includes a computing device for secure mediated reality content creation, the computing device comprising: means for provisioning a computing device with an attestation credential; means for performing, in response to provisioning the computing device with the attestation credential, an attestation procedure with a mediated reality server based on the attestation credential of the computing device; means for securely provisioning a session encryption key to the computing device from the mediated reality server in response to performing the attestation procedure; means for generating protected mediated reality content; and means for securely sending the protected mediated reality content and an associated license from the computing device to the mediated reality server, wherein the protected mediated reality content is protected by the session encryption key and the license defines one or more content usage restrictions for the associated protected mediated reality content.

Example 97 includes the subject matter of Example 96, and wherein: the means for performing the attestation procedure comprises (i) means for verifying authenticity of the computing device using the attestation credential and (ii) means for establishing a secure communication channel between the computing device and the mediated reality server in response to verifying the authenticity of the computing device; and the means for securely provisioning the session encryption key comprises means for securely provisioning the session encryption key to the computing device via the secure communication channel.

Example 98 includes the subject matter of any of Examples 96 and 97, and wherein the means for performing the attestation procedure comprises means for performing a secure key exchange between the computing device and the mediated reality server.

Example 99 includes the subject matter of any of Examples 96-98, and wherein the means for provisioning the computing device with the attestation credential comprises means for provisioning, by a manufacturer of the computing device, the computing device with an enhanced privacy identifier private key.

Example 100 includes the subject matter of any of Examples 96-99, and further comprising: means for securely provisioning a back-channel encryption key to the computing device from the mediated reality server in response to performing the attestation procedure; and means for securely receiving aggregated feedback data from the mediated reality server, wherein the aggregated feedback data is aggregated from feedback data generated by a plurality of mediated reality listeners, and wherein the aggregated feedback data is protected by the back-channel encryption key.

Example 101 includes the subject matter of any of Examples 96-100, and wherein the aggregated feedback data is indicative of an emotion of a user of a mediated reality listener.

Example 102 includes the subject matter of any of Examples 96-101, and wherein the feedback data further comprises aggregated content metric data generated by the plurality of mediated reality listeners.

The invention claimed is:

1. A computing device for secure mediated reality content publishing, the computing device comprising:
   an attestation module to perform an attestation procedure with a mediated reality listener based on a pre-provisioned attestation credential of the mediated reality listener;
   a key management module to securely provision a session encryption key to the mediated reality listener in response to performance of the attestation procedure;
   a composition module to generate aggregated mediated reality content based on protected mediated reality content received from each of a plurality of mediated reality creators;
   a license management module to generate, by a trusted execution environment of the computing device, a first license associated with the aggregated mediated reality content based on a plurality of licenses associated with the protected mediated reality content, wherein the first license defines one or more content usage restrictions for the aggregated mediated reality content; and
   a communication module to securely send the aggregated mediated reality content and the first license to the mediated reality listener, wherein the aggregated mediated reality content is protected by the session encryption key.

2. The computing device of claim 1, wherein:
   to perform the attestation procedure comprises to (i) verify authenticity of the mediated reality listener with the attestation credential of the mediated reality listener and (ii) establish a secure communication channel between the computing device and the mediated reality listener in response to verification of the authenticity of the mediated reality listener; and
   to securely provision the session encryption key comprises to securely provision the session encryption key to the mediated reality listener via the secure communication channel.

3. The computing device of claim 1, wherein to perform the attestation procedure comprises to perform a secure key exchange between the computing device and the mediated reality listener.

4. The computing device of claim 1, wherein the pre-provisioned attestation credential of the mediated reality listener comprises an enhanced privacy identifier private key provisioned to the mediated reality listener by a manufacturer of the mediated reality listener.

5. The computing device of claim 1, wherein:
   the attestation module is further to perform an attestation procedure with a mediated reality creator based on a pre-provisioned attestation credential of the mediated reality creator; and
   the key management module is further to securely provision a second session encryption key to the mediated reality creator in response to the performance of the attestation procedure;
   wherein the protected mediated reality content received from the mediated reality creator is protected by the second session encryption key.

6. The computing device of claim 1, wherein the key management module is further to derive the session encryption key for the mediated reality listener in response to the performance of the attestation procedure.

7. The computing device of claim 1, wherein to generate the aggregated mediated reality content comprises to generate, by the trusted execution environment of the computing device, the aggregated mediated reality content based on the protected mediated reality content.

8. The computing device of claim 1, further comprising a feedback module to:
   receive feedback data from the mediated reality listener, wherein the feedback data is generated by one or more feedback sensors of the mediated reality listener, and wherein the feedback data is protected by a back-channel encryption key;
   wherein the key management module is further to securely provision the back-channel encryption key to the mediated reality listener in response to the performance of the attestation procedure.

9. The computing device of claim 8, wherein the feedback module is further to modify the aggregated mediated reality content based on the feedback data in response to receipt of the feedback data from the mediated reality listener.

10. The computing device of claim 8, wherein the feedback data is indicative of an emotion of a user of the mediated reality listener.

11. The computing device of claim 8, wherein the feedback module is further to aggregate the feedback data with feedback data received from one or more other mediated reality listeners to generate aggregated feedback data.

12. The computing device of claim 1, wherein to securely send the aggregated mediated reality content to the mediated reality listener comprises to:
   encrypt the aggregated mediated reality content with a mash-up content key to generate encrypted aggregated mediated reality content;
   encrypt the mash-up content key with the session encryption key to generate an encrypted mash-up content key; and
   send the encrypted aggregated mediated reality content and the encrypted mash-up content key to the mediated reality listener.

13. The computing device of claim 1, wherein the communication module is further to receive the protected mediated reality content and the associated plurality of licenses from the plurality of mediated reality creators, wherein the protected mediated reality content is encrypted and wherein each of the plurality of licenses defines one or more content usage restrictions for the associated protected mediated reality content.

14. A method for secure mediated reality content publishing, the method comprising:

performing, by a computing device, an attestation procedure with a mediated reality listener based on a pre-provisioned attestation credential of the mediated reality listener;

securely provisioning, by the computing device, a session encryption key to the mediated reality listener in response to performing the attestation procedure;

generating, by the computing device, aggregated mediated reality content based on protected mediated reality content received from each of a plurality of mediated reality creators;

generating, by a trusted execution environment of the computing device, a first license associated with the aggregated mediated reality content based on a plurality of licenses associated with the protected mediated reality content, wherein the first license defines one or more content usage restrictions for the aggregated mediated reality content; and securely sending, by the computing device, the aggregated mediated reality content and the first license to the mediated reality listener, wherein the aggregated mediated reality content is protected by the session encryption key.

15. The method of claim 14, wherein generating the aggregated mediated reality content comprises generating, by the trusted execution environment of the computing device, the aggregated mediated reality content based on the protected mediated reality content.

16. The method of claim 14, further comprising:
securely provisioning, by the computing device, a back-channel encryption key to the mediated reality listener in response to performing the attestation procedure; and receiving, by the computing device, feedback data from the mediated reality listener, wherein the feedback data is generated by one or more feedback sensors of the mediated reality listener, and wherein the feedback data is protected by the back-channel encryption key.

17. The method of claim 16, further comprising modifying, by the computing device, the aggregated mediated reality content based on the feedback data in response to receiving the feedback data from the mediated reality listener.

18. The method of claim 16, further comprising aggregating, by the computing device, the feedback data with feedback data received from one or more other mediated reality listeners to generate aggregated feedback data.

19. One or more non-transitory, computer-readable storage media comprising a plurality of instructions that in response to being executed cause a computing device to:
perform an attestation procedure with a mediated reality listener based on a pre-provisioned attestation credential of the mediated reality listener;

securely provision a session encryption key to the mediated reality listener in response to performing the attestation procedure;

generate aggregated mediated reality content based on protected mediated reality content received from each of a plurality of mediated reality creators;

generate, by a trusted execution environment of the computing device, a first license associated with the aggregated mediated reality content based on a plurality of licenses associated with the protected mediated reality content, wherein the first license defines one or more content usage restrictions for the aggregated mediated reality content; and securely send the aggregated mediated reality content and the first license to the mediated reality listener, wherein the aggregated mediated reality content is protected by the session encryption key.

20. The one or more non-transitory, computer-readable storage media of claim 19, wherein:
to perform the attestation procedure comprises to (i) verify authenticity of the mediated reality listener using the attestation credential of the mediated reality listener and (ii) establish a secure communication channel between the computing device and the mediated reality listener in response to verifying the authenticity of the mediated reality listener; and to securely provision the session encryption key comprises to securely provision the session encryption key to the mediated reality listener via the secure communication channel.

21. The one or more non-transitory, computer-readable storage media of claim 19, wherein to perform the attestation procedure comprises to perform a secure key exchange between the computing device and the mediated reality listener.

22. The one or more non-transitory, computer-readable storage media of claim 19, wherein to generate the aggregated mediated reality content comprises to generate, by the trusted execution environment of the computing device, the aggregated mediated reality content based on the protected mediated reality content.

23. The one or more non-transitory, computer-readable storage media of claim 19, further comprising a plurality of instructions that in response to being executed cause the computing device to:
securely provision a back-channel encryption key to the mediated reality listener in response to performing the attestation procedure; and receive feedback data from the mediated reality listener, wherein the feedback data is generated by one or more feedback sensors of the mediated reality listener, and wherein the feedback data is protected by the back-channel encryption key.

24. The one or more non-transitory, computer-readable storage media of claim 23, further comprising a plurality of instructions that in response to being executed cause the computing device to modify the aggregated mediated reality content based on the feedback data in response to receiving the feedback data from the mediated reality listener.

25. The one or more non-transitory, computer-readable storage media of claim 23, further comprising a plurality of instructions that in response to being executed cause the computing device to aggregate the feedback data with feedback data received from one or more other mediated reality listeners to generate aggregated feedback data.

* * * * *